United States Patent [19]

Ueda et al.

[11] Patent Number: 5,038,415
[45] Date of Patent: Aug. 13, 1991

[54] DISPERSE DYE COMPOSITION USEFUL FOR DYEING OF PRINTING HYDROPHOBIC FIBER MATERIALS: MIXTURE OF PYRIDONE MONO-AZO DYES AND OPTIONALLY A QUINO-PHTHALONE

[75] Inventors: Yasuyoshi Ueda, Hirakata; Junichi Sekihachi, Osaka; Takashi Omura, Kobe; Hideo Hattori, Toyonaka; Kiyoharu Nakatsuka, Niihama, all of Japan

[73] Assignee: Sumitomo Chemical Company, Limited, Osaka, Japan

[21] Appl. No.: 462,738

[22] Filed: Jan. 9, 1990

[30] Foreign Application Priority Data

Jan. 10, 1989 [JP] Japan ................................. 1-4296
Jan. 10, 1989 [JP] Japan ................................. 1-4297

[51] Int. Cl.$^5$ ...................... C09B 29/42; C09B 67/22; D06P 1/18
[52] U.S. Cl. ............................................ 8/639; 8/532; 8/662; 8/693; 8/694; 8/695; 8/696; 8/921; 8/922; 8/924; 534/753; 534/770
[58] Field of Search ...................... 8/639, 532

[56] References Cited

U.S. PATENT DOCUMENTS 4,327,018 4/1982 Liechti et al. .................. 534/773
4,427,413 1/1984 Bauerle .......................... 8/471
4,548,613 10/1985 Bode et al. .

FOREIGN PATENT DOCUMENTS 083313 7/1983 European Pat. Off. .
085823 8/1983 European Pat. Off. .
3012863 10/1981 Fed. Rep. of Germany .
58/149953 9/1983 Japan .
1377614 12/1974 United Kingdom .

*Primary Examiner*—A. Lionel Clingman
*Attorney, Agent, or Firm*—Birch, Stewart, Kolasch & Birch

[57] ABSTRACT

A disperse dye composition comprising (a) a pyridone monoazo compound of the formula (I),

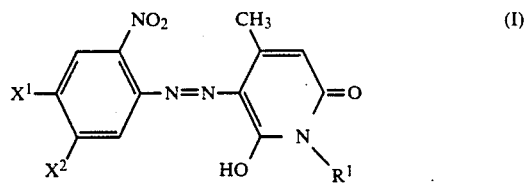

wherein $X^1$ and $X^2$ are each hydrogen, halogen, alkyl, alkoxy or others, and $R^1$ is alkyl, alkenyl, cycloalkyl, phenyl or anilino, and (b) a pyridone monoazo compound of the formula (II).

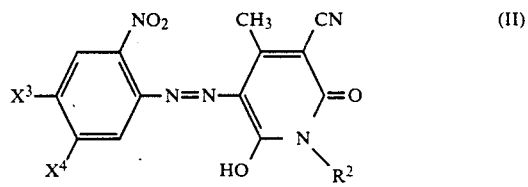

wherein $X^3$ and $X^4$ are each hydrogen, halogen, alkyl, alkoxy or others, and $R^2$ is alkyl, alkenyl, cycloalkyl, phenyl or anilino, optionally together with (c) a quinophthalone compound of the formula (III),

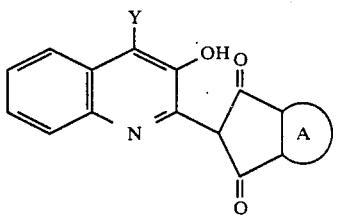

wherein Y is hydrogen or bromine, and the ring A is unsubstituted or substituted benzene or naphthalene ring, which is useful as a yellow dye component for dyeing or printing hydrophobic fiber materials with superior dye bath stability and level dyeing property.

47 Claims, No Drawings

DISPERSE DYE COMPOSITION USEFUL FOR DYEING OF PRINTING HYDROPHOBIC FIBER MATERIALS: MIXTURE OF PYRIDONE MONO-AZO DYES AND OPTIONALLY A QUINO-PHTHALONE

The present invention relates to a disperse dye composition and a process for dyeing or printing hydrophobic fiber materials using the same. More specifically, the present invention relates to a disperse dye composition comprising pyridone monoazo dyes, which is usable as a yellow dye component in a trichromatic dyeing or printing of hydrophobic fiber materials.

Pyridone monoazo dyes usable for dyeing or printing hydrophobic fiber materials in a greenish yellow or orange color are known. For example, a dye of the following formula,

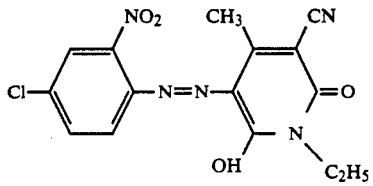

is disclosed in Published Examined Japanese Patent Application (Japanese Patent Publication) No. 47-18549, and a dye of the formula,

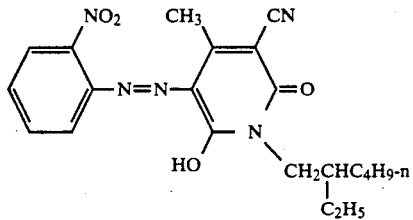

in Published Unexamined Japanese Patent Application (Japanese Patent Kokai) No. 52-112629. Other pyridone monoazo dyes are disclosed in, for example, Japanese Patent Publication Nos. 49-26108 and 54-6250, and Japanese Patent Kokai Nos., 58-57467 and 58-149953.

However, these known pyridone monoazo dyes cannot compare with quinophthalone dyes which have been extensively used as a disperse yellow dye, particularly in stability under dyeing or printing conditions (hereinafter referred to as dye bath stability) and light fastness property. For example, when used in combination with a red dye and a blue dye both in a widespread use to perform a trichromatic dyeing of hydrophobic fiber materials, troubles such as unlevel dyeing are often caused due to the presence of such pyridone monoazo dyes. Particularly, in a light color dyeing, it is often to cause troubles such as difference in a shade between batches of the dyeing, occurrence of speck dyeing, change in color due to sun light and the like, because of the pyridone monoazo dyes being inferior in the dye bath stability, level dyeing property and light fastness.

In order to improve the dye bath stability of the pyridone monoazo dyes, it has been attempted to use a mixture of two or more dyes, as disclosed in Japanese Patent Kokai Nos. 56-151765, 58-149957 and 58-138756. However, these attempts are not yet sufficient to improve the dye bath stability, and therefore the pyridone monoazo dyes are awaiting further improvement in this respect together with dyeability, level dyeing property and fastness properties.

The present inventors have undertaken extensive studies to find a pyridone monoazo yellow dye superior in the dye bath stability as well as dyeability, level dyeing property and fastness properties, and as a result found that the object can be accomplished by providing a combination of specific pyridone monoazo dyes.

The present invention provides a disperse dye composition comprising a two component system of one or more members selected from pyridone monoazo compounds represented by the following formula (I), and their tautomers,

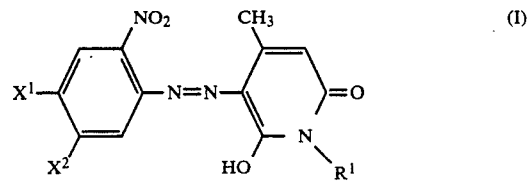

wherein $X^1$ and $X^2$ independently of one another are each a hydrogen atom, a halogen atom, an alkyl group, an alkoxy group, an unsubstituted or substituted alkoxycarbonyl group, an alkylcarbonyl group, an alkylsulfonyl group, an arylsulfonyl group, an unsubstituted or alkyl-substituted carbamoyl or sulfamoyl group or cyano group, and $R^1$ is an unsubstituted or substituted alkyl group, an alkenyl group or an unsubstituted or substituted cycloalkyl, phenyl or anilino group, and one or more members selected from pyridone monoazo compounds represented by the following formula (II), and their tautomers,

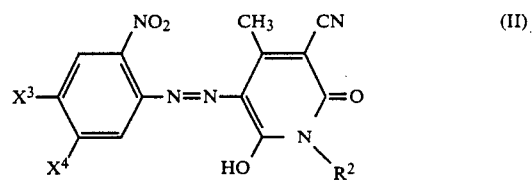

wherein $X^3$ and $X^4$ independently of one another are each a hydrogen atom, a halogen atom, an alkyl group, an alkoxy group, an unsubstituted or substituted alkoxycarbonyl group, an alkylcarbonyl group, an alkylsulfonyl group, an arylsulfonyl group, an unsubstituted or alkyl-substituted carbamoyl or sulfamoyl group or a cyano group, and $R^2$ is an unsubstituted or substituted alkyl group, an alkenyl group or an unsubstituted or substituted cycloalkyl, phenyl or anilino group.

The present invention also provides a disperse dye composition comprising a three component system of one or more members selected from the pyridone monoazo compounds (I) and their tautomers, one or more members selected from the pyridone monoazo compounds (II) and their tautomers, and one or more members selected from quinophthalone compounds represented by the following formula (III),

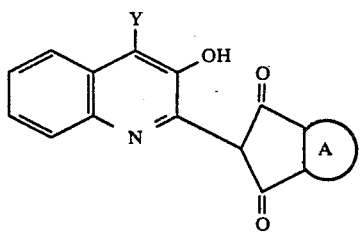

wherein Y is a hydrogen atom or a bromine atom, and the ring A is a benzene or naphthalene ring unsubstituted or substituted by an unsubstituted or alkyl-substituted carbamoyl group or an alkoxycarbonyl group.

The present invention further provides a process for dyeing or printing hydrophobic fiber materials, which comprises using the disperse dye composition comprising the two or three component system.

The pyridone monoazo compound of the formula (I) usable for the disperse dye composition of the present invention includes a novel compound which is represented by the following formula,

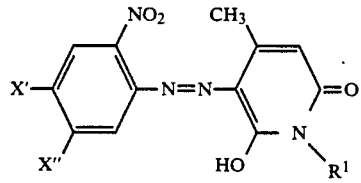

wherein X' and X" have the same meanings as $X^1$ and $X^2$ excepting hydrogen.

In the above formulas (I) and (II), the alkyl group and the alkyl moiety in the alkoxy, alkylcarbonyl, alkylsulfonyl and alkyl-substituted carbamoyl and sulfamoyl groups represented by $X^1$, $X^2$, $X^3$ and $X^4$ are preferably ones having 1 to 4 carbon atoms, the alkyl moiety in the alkoxycarbonyl group represented by them is preferably one having 1 to 5 carbon atoms, and is unsubstituted or substituted by an alkoxy group having 1 to 4 carbon atoms, a phenyl group or a phenoxy group.

Examples of these alkyl and alkoxy groups are methyl, ethyl, propyl and butyl, and methoxy, ethoxy, propoxy and butoxy, respectively. The alkylcarbonyl group includes acetyl, propionyl and the like, and the alkoxycarbonyl group includes methoxycarbonyl, ethoxycarbonyl, propoxycarbonyl, butoxycarbonyl, ethoxyethoxycarbonyl, methoxybutoxycarbonyl, benzyloxycarbonyl, phenylpropoxycarbonyl, phenoxyethoxycarbonyl and the like. The alkylsulfonyl group includes methylsulfonyl, ethylsulfonyl, propylsulfonyl, butylsulfonyl and the like. The arylsulfonyl group includes phenylsulfonyl, toluenesulfonyl, chloro- or bromo-phenylsulfonyl and the like. The carbamoyl and sulfamoyl groups include carbamoyl, ethylcarbamoyl, butylcarbamoyl, sulfamoyl, ethylsulfamoyl, butylsulfamoyl and the like.

Of these groups represented by $X^1$, $X^2$, $X^3$ and $X^4$, preferred are hydrogen, halogen, alkyl, alkoxy, alkylsulfonyl, arylsulfonyl and cyano, and particularly preferred are hydrogen, chlorine, bromine, methyl, ethyl, isopropyl, methylsulfonyl, phenylsulfonyl and cyano.

The alkyl group represented by $R^1$ and $R^2$ is preferably one having 1 to 8 carbon atoms, and is unsubstituted or substituted by chlorine, bromine, hydroxy or a group of the following formula,

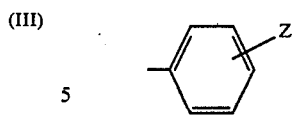

wherein Z is a hydrogen atom, a halogen atom, an alkyl group having 1 to 4 carbon atoms or an alkoxy group having 1 to 4 carbon atoms, or the following formula, —OR, —OCOR, —OCOOR, —COOR,
—NHSO$_2$R, —NHCOR or —OCONHR wherein R is an alkyl group having 1 to 4 carbon atoms, an alkenyl group having 3 to 5 carbon atoms, an alkoxyalkyl group having 1 to 4 carbon atoms, or a cycloalkyl group having 5 or 6 carbon atoms which is unsubstituted or substituted by an alkyl group having 1 to 4 carbon atoms, or the following formula,

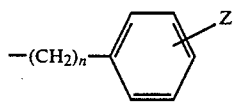

wherein Z is as defined above and n is 0 or an integer of 1 to 3.

Examples of the alkyl group represented by $R^1$ and $R^2$ are methyl, ethyl, n- or iso-propyl, n-, sec- or iso-butyl, 2-ethylhexyl, chloro- or bromo-ethyl, hydroxyethyl, cyanoethyl, phenylalkyl such as benzyl and phenethyl, alkoxyalkyl such as methoxyethyl, ethoxypropyl and allyloxyethyl, alkoxyalkoxyalkyl such as methoxyethoxyethyl, acyloxyalkyl such as acetoxyethyl and propionyloxybutyl, alkoxycarbonyloxyalkyl such as butoxycarbonyloxyethyl and cyclohexyloxycarbonylbutyl, alkoxycarbonylalkyl such as ethoxycarbonylethyl, sulfonylaminoalkyl such as methylsulfonylaminopropyl, acylaminoalkyl such as acetylaminoethyl and butylylaminopropyl, carbamoyloxyalkyl such as propylaminocarbonyloxyethyl and cyclohexylaminocarbonyloxybutyl, phenyloxyalkyl such as phenoxyethyl and phenoxypropyl, phenylalkyloxyalkyl such as benzyloxyethyl and phenethyloxyalkyl, phenylcarbonyloxyalkyl such as benzoyloxyethyl, phenyloxycarbonyloxyalkyl such as phenoxycarbonyloxyethyl, phenyloxycarbonylalkyl such as phenoxycarbonylethyl, phenylsulfonylaminoalkyl such as phenylsulfonylaminoethyl, phenylcarbonylaminoalkyl such as benzoylaminoethyl, and phenylcarbamoyloxyalkyl such as phenylcarbamoyloxyethyl. The substituent (Z) on the phenyl group includes hydrogen, chloro, bromo, methyl, ethyl, methoxy, ethoxy and the like.

The alkenyl group represented by $R^1$ and $R^2$ is preferably one having 3 to 5 carbon atoms, and includes allyl, crotyl and the like.

The cycloalkyl group represented by them is preferably one having 5 or 6 carbon atoms, which is unsubstituted or substituted by an alkyl group having 1 to 4 carbon atoms, and includes cyclohexyl, methylcyclohexyl, cyclopentyl and the like.

The phenyl and anilino groups also represented by $R^1$ and $R^2$ are independently unsubstituted or substituted by an alkyl group having 1 to 4 carbon atoms, an alkoxy group having 1 to 4 carbon atoms or a halogen atom at their o-, m- or p-positions. Examples thereof are phenyl, tolyl, methoxyphenyl, ethoxyphenyl, chloro-phenyl, bromophenyl, anilino, methylanilino, methoxyanilino, chloroanilino and bromoanilino.

Of these represented by $R^1$ and $R^2$, preferred are unsubstituted alkyl having 1 to 8 carbon atoms, allyl, benzyl, phenethyl and cyano-substituted alkyl having 1 to 4 carbon atoms, $-OR^3$, $-OCOR^3$ or $-CO_2R^3$ in which $R^3$ is an alkyl group having 1 to 4 carbon atoms, or allyl or phenyl group.

Among the pyridone monoazo compounds (I) to be used in the present invention, preferred are those of the formula (I), wherein $X^2$ is hydrogen and $X^1$ is any one of those as defined above excepting hydrogen, or $X^1$ is hydrogen and $X^2$ is any one of those as defined above excepting hydrogen, or both $X^1$ and $X^2$ are each any one of those as defined above excepting hydrogen, and $R^1$ is unsubstituted $C_1$ to $C_8$ alkyl, allyl, benzyl, phenethyl or $C_1$ to $C_4$ alkyl substituted by cyano, $-OR^3$, $-OCOR^3$ or $-CO_2R^3$ in which $R^3$ is as defined above. Preferred examples of those excepting hydrogen are halogen such as chlorine and bromine, $C_1$ to $C_4$ alkyl, $C_1$ to $C_4$ alkoxy, $C_1$ to $C_4$ alkylsulfonyl and phenylsulfonyl.

Of these, particularly preferred are pyridone monoazo compounds of the formula (I) wherein $X^1$ is halogen such as chlorine or bromine, $X^2$ is hydrogen or chlorine, and $R^1$ is unsubstituted $C_1$ to $C_4$ alkyl.

More specifically, preferred embodiments of the pyridone monoazo compounds to be used in the present invention are as follows:

| Embodiment No. | $X^1$ | $X^2$ | $R^1$ |
|---|---|---|---|
| a | Cl | H | $CH_3$ |
| b | Cl | H | $C_2H_5$ |
| c | Cl | H | $C_3H_7$ |
| d | Cl | H | $C_4H_9$ |
| e | Br | H | $CH_3$ |
| f | Br | H | $C_2H_5$ |
| g | Br | H | $C_3H_7$ |
| h | Cl | Cl | $CH_3$ |
| i | Cl | Cl | $C_2H_5$ |
| j | Br | Cl | $CH_3$ |

Among the pyridone monoazo compounds (II) to be used in the present invention, preferred are those of the formula (II) wherein $X^4$ is hydrogen and $X^3$ is any one of those as defined above excepting hydrogen, or $X^3$ is hydrogen and $X^4$ is any one of those as defined above excepting hydrogen, or both $X^3$ and $X^4$ are each any one of those as defined above excepting hydrogen, and $R^2$ is the same as given above for $R^1$. Preferred examples of those excepting hydrogen are the same as given above for the pyridone monoazo compounds (I).

More specifically, preferred embodiments of the pyridone monoazo compounds (II) are as follows:

| Embodiment No. | $X^3$ | $X^4$ | $R^2$ |
|---|---|---|---|
| k | Cl | H | $CH_3$ |
| l | Cl | H | $C_2H_5$ |
| m | Cl | H | $C_3H_7$ |
| n | Cl | H | $C_4H_9$ |
| o | Br | H | $CH_3$ |
| p | Br | H | $C_2H_5$ |
| q | Br | H | $C_3H_7$ |
| r | Cl | Cl | $CH_3$ |
| s | Cl | Cl | $C_2H_5$ |
| t | Br | Cl | $CH_3$ |
| u | $CH_3$ | H | $C_2H_5$ |

-continued

| Embodiment No. | $X^3$ | $X^4$ | $R^2$ |
|---|---|---|---|
| v | $-CH(CH_3)_2$ | H | $CH_3$ |

Among the quinophthalone compounds (III), preferred are those represented by the following formula (IV),

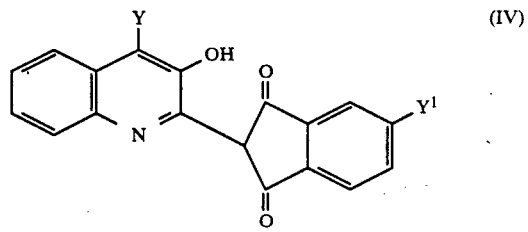

wherein Y is as defined above, and $Y^1$ is a hydrogen atom, a carbamoyl group unsubstituted or substituted by an alkyl group, or an alkoxycarbonyl group.

The alkyl moiety in the alkoxycarbonyl group and the substituent alkyl group are preferably one having 1 to 4 carbon atoms, and include, for example, methyl, ethyl, propyl and butyl.

Of these, particularly preferred are those having hydrogen as $Y^1$.

Those having hydrogen as $Y^1$ and hydrogen or bromine as Y are well known as C.I. Disperse Yellow 54 and C.I. Disperse Yellow 64, respectively, which are particularly advantageously used in the present invention.

The pyridone monoazo compound (I) can be produced in any manner known per se, for example, by diazotizing a diazo component represented by the following formula (Ia),

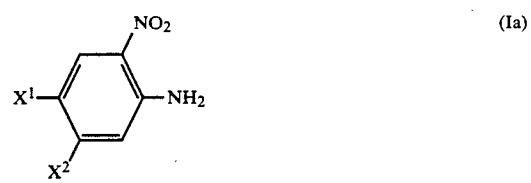

wherein $X^1$ and $X^2$ are as defined above, and reacting the resulting diazonium salt with a coupling component represented by the following formula (Ib),

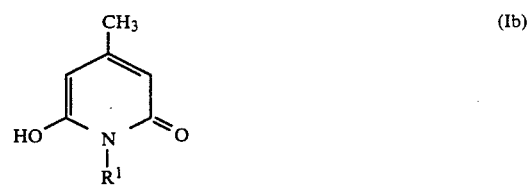

wherein $R^1$ is as defined above, or by reacting a monoazo compound represented by the following formula (Ic),

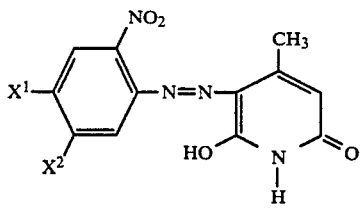 (Ic)

wherein X¹ and X² are as defined above, with a compound like an alkylating agent, represented by the following formula (Id), R¹—L  (Id)

wherein R¹ is as defined above, and L is a splittable group.

The pyridone monoazo compound (II) can be also produced in any manner known per se, for example in a manner similar to that explained above for the production of the pyridone monoazo compound (I), provided that a diazo component represented by the following formula (IIa),

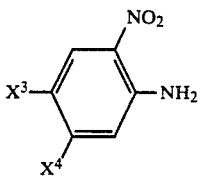 (IIa)

wherein X³ and X⁴ are as defined above, a coupling component represented by the following formula (IIb),

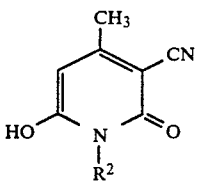 (IIb)

wherein R² is as defined above, a monoazo compound represented by the following formula (IIc),

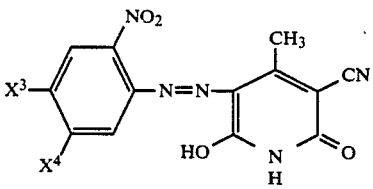 (IIc)

wherein X³ and X⁴ are as defined above, and a compound like an alkylating agent represented by the following formula (IId), R²—L  (IId)

wherein R² and L are as defined above, are used in place of those represented by the formulas (Ia), (Ib), (Ic) and (Id), respectively.

In the production of the disperse dye composition having the two component system, a mixing weight ratio of the pyridone monoazo compounds (I):(II) can be determined depending on the desired dye properties, and can be selected usually from a range of 99 to 1:1 to 99, preferably from 15 to 95:85 to 5. The higher the weight ratio of the pyridone monoazo compound (I), the superior the dye bath stability and light fastness of the disperse dye composition will be, and the higher the weight ratio of the other compound (II), the superior the color yield and build-up property will be.

In the production of the disperse dye composition having the three component system, a mixing weight ratio of the pyridone monoazo compounds (I):(II): the quinophthalone compound (III) can be also determined depending on the desired dye properties, and can be selected from a range of 5 to 90:5 to 90:5 to 90, preferably 10 to 50:10 to 70:10 to 50.

The disperse dye composition of the present invention can be produced in the form of liquid, powder, granule or grain by dispersing each compound produced independently and then mixing each resulting dispersion in the weight ratio defined above, or by mixing each compound in the weight ratio defined above, and then dispersing the resulting mixture.

In producing the dye composition of two component system, each diazo component and each coupling component for the production of compounds (I) and (II) can be mixed so as to make the weight ratio as defined above, and then the resulting mixture can be subjected to diazotization and subsequent coupling reaction, thereby obtaining the desired disperse dye composition. The thus obtained dye composition of two component system can be further mixed with the compound (III) produced independently thereof to obtain the desired three component dye composition.

The dispersing of respective compounds (I), (II) and (III) or a mixture thereof can be carried out in a sand mill or the like using a predetermined amount of an aqueous medium and a dispersing agent selected from anionic dispersing agents such as naphthalenesulfonic acid/formalin condensate, ligninesulfonic acid or cresol-Schäffer's acid/formalin condensate, and nonionic dispersing agents such as polyoxyethylene alkyl ethers or polyoxyethylene alkylphenyl ethers. The resulting dispersion liquid can be used as it is in the liquid form, or can be dried to obtain a desired powder, granule or grain form.

The disperse dye composition in accordance with the present invention can comprise other disperse dyes such as C.I. Disperse Red 60, C.I. Disperse Blue 56 or the like or a mixture thereof to obtain a desired color shade, weighting agents, pH adjusters, disperse level-dyeing agents, dyeing auxiliaries and the like.

The present disperse dye composition can be used advantageously for dyeing hydrophobic fiber materials such as synthetic fibers including polyester fibers, polyamide fiber and the like, semi synthetic fibers including di- or tri-acetate and the like, or a blended or union product thereof with natural fibers such as cotton, wool or the like, particularly those such as polyester fiber or a blended or union product thereof with natural or regenerated cellulose fibers.

The dyeing of such fiber materials can be carried out in a conventional manner such as dip dyeing method, continuous dyeing method, carrier dyeing method, printing method or others.

For example, the dip dyeing can be carried out by dispersing the present dye composition in an aqueous medium to obtain a dye bath, if desired, adding a pH adjuster and/or a disperse level-dyeing agent thereto, adding polyester fiber thereinto, and heating the dye bath at a temperature of 105° C. or higher, preferably at 110° to 140° C. under increased pressure for 30 to 60 minutes. The dyeing period of time may be shortened or prolonged depending on a degree of dyeing affinity.

The continuous dyeing can be carried out by padding cloth with a padding liquor containing the present dye composition and subjecting the cloth to steaming or dry heat treatment at a temperature of 100° C. or higher.

The carrier dyeing can be carried out in the presence of a carrier such as O-phenylphenol, methylnaphthalene or the like at a relatively high temperature such as boiling temperature of water.

The printing can be carried out by printing cloth with a color paste prepared in advance by mixing a dispersion liquor of the present dye composition with a stock paste, and drying the printed cloth, followed by steaming or dry heat treatment.

Thus, the disperse dye composition of the present invention can afford a dyed product of a brilliant greenish yellow to orange color, or other colors such as brown, gray, beige or the like when used in combination with the other dyes as described above, which color is superior in fastness properties such as light fastness, wet fastness, sublimation fastness, after-finishing fastness or the like, with superior dyeabilities, particularly those such as color yield, and superior dye bath stability.

The disperse dye composition of the present invention can be advantageously applied particularly for the exhaustion dyeing because of its superior level dyeing property coupled with the superior dye bath stability so that uniformly dyed products can be readily obtained with superior reproductivity.

The present invention is illustrated in more detail with reference to the following Examples, which are only illustrative but not limitative for the scope of the present invention. In Examples, all parts and % are by weight unless otherwise specified.

EXAMPLE 1 a) Preparation of disperse dye composition

A compound (9 parts) of the following formula (1),

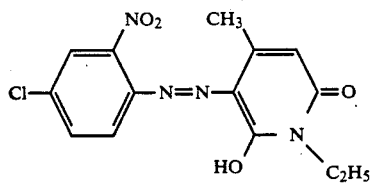

and a compound (21 parts) of the following formula (2),

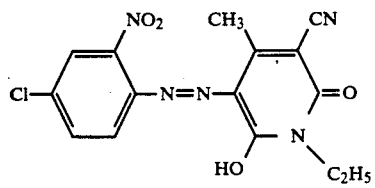

were mixed with naphthalenesulfonic acid-formalin condensate (70 parts) in water (150 parts), and the mixture was treated for 10 hours in a sand mill to obtain the desired disperse dye composition in the form of a dispersion liquid.

b) Dyeing of polyester

The dispersion liquid obtained above (0.5 part) and water (3000 parts) were placed in a pot, and adjusted to pH 5 using acetic acid. Polyester cloth (100 parts) was dipped therein, and dyeing was continued for 60 minutes at 130° C. Thereafter, the polyester cloth taken out was rinsed and dried in a conventional manner, thereby obtaining a dyed product of a brilliant deep greenish yellow superior in fastness properties such as light fastness.

The dye bath stability and migration percentage which is an index to the level dyeing property, both being measured as follows, were superior as shown in Table 1.

Dye bath stability

The dispersion liquid obtained in item a) (0.5 part) and water (3000 parts) were place in a pot, and the content was adjusted to pH 5, then heated to 140° C. and kept for 30 minutes at this temperature. Then, after cooling to 90° C., polyester cloth (100 parts) was dipped therein, and dyeing was continued for 60 minutes at 130° C. The polyester cloth taken out was rinsed and dried in a conventional manner to obtain a dyed product.

The dye bath stability at pH 5 was calculated by the following equation, provided that both color values of the dyed product and a standard dyed product which is that obtained in the above item b) were measured using SICOMUC-20 (a color value measuring computer system sold by Sumika Chemical Analysis Service).

Dye bath stability (%) =

$$\frac{\text{Color value of the dyed product to be tested}}{\text{Color value of a standard dyed product}} \times 100$$

In addition, in order to examine the effect of a pH at which the dyeing was continued, the above procedure was repeated, provided that the pH was adjusted to 7.

Migration percentage

The standard dyed product obtained in item b) and an undyed white cloth were put one over the other, kept for 60 minutes at 130° C., then washed with water and dried. The migration percentage was calculated by the following equation, provided that the weights of dyes migrating and remaining on the white cloth and the standard dyed product, repsectively, were calculated from the color values obtained using the SICOMUC-20.

Migration percentage (%) =

$$\frac{\text{Weight of dye migrating on white cloth}}{\text{Weight of dye remaining on standard dyed product}} \times 100$$

COMPARATIVE EXAMPLE 1

In a manner similar to that of Example 1, the disperse dye composition was obtained, provided that the dye of the formula (2) only was used, and the dyeing was carried out to find the dye bath stability and migration percentage thereof. The results were as shown in Table 1.

EXAMPLE 2

In a manner similar to that of Example 1, a disperse dye composition was obtained, provided that compounds of the following formulas (3) and (4),

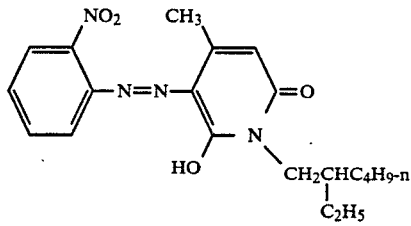
(3)

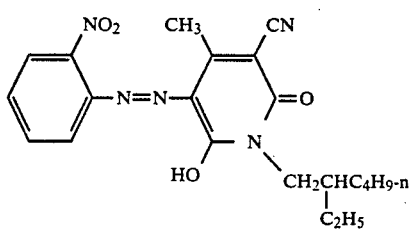
(4)

were used in each amount of 15 parts, and the dyeing of polyester cloth was carried out using the disperse dye composition obtained above to obtain a dyed product of a brilliant deep greenish yellow color superior in fastness properties such as light fastness. The dye bath stability and migration percentage thereof found in each manner described in Example 1 were superior as shown in Table 1.

COMPARATIVE EXAMPLE 2

Example 2 was repeated, provided that the compound of the formula (4) only was used. The dye bath stability and mingration percentage thereof were as shown in Table 1.

|  | Compound used | Dye bath stability (%) pH 5 | Dye bath stability (%) pH 7 | Migration percentage (%) |
| --- | --- | --- | --- | --- |
| Example 1 | Compound of formula (1)* | 30% | 88 | 63 | 78 |
|  | Compound of formula (2)** | 70% |  |  |  |
| Example 2 | Compound of formula (3)*** | 50% | 97 | 83 | 45 |
|  | Compound of formula (4)**** | 50% |  |  |  |
| Comparative Example 1 | Compound of formula (2) | 100% | 73 | 17 | 67 |
| Comparative Example 2 | Compound of formula (4) | 100% | 93 | 54 | 32 |

Note
*Compound disclosed in Japanese Patent Kokai No. 63-199761
**Compound disclosed in Japanese Patent Publication No. 47-18549
***Compound disclosed in Japanese Patent Kokai No. 63-95267
****Compound disclosed in Japanese Patent Kokai No. 52-112679

EXAMPLE 3

In a manner similar to that of Example 1, a disperse dye composition was obtained, provided that a compound (19 parts) of the following formula (5),

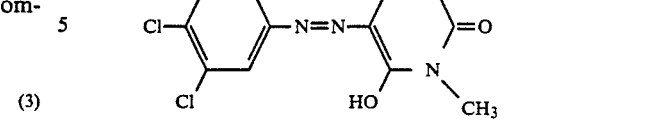
(5)

and the compound (11 parts) of the formula (2) were used, and the dyeing of polyester cloth was carried out using it to obtain a dyed product of a brilliant deep greenish yellow color superior in fastness properties such as light fastness. The dye bath stability was found to be superior.

The compound of the formula (5) was obtained in the following manner.

A solution of sodium nitrate (7 parts) in water (50 parts) was added to a mixture of 4,5-dichloro-2-nitroaniline (20.7 parts), water (180 parts) and 30% hydrochloric acid (36 parts), while being stirred vigorously at 0° to 5° C. to perform diazotization. The resulting diazonium liquor was added dropwise at 0° to 5° C. to a solution of 1,4-dimethyl-6-hydroxy-pyrid-2-one (12.6 parts) in a mixture of 28% sodium hydroxide (25 parts), sodium acetate (33 parts) and water (600 parts), and the mixture was stirred for 30 minutes at that temperature. The reaction mixture was made acid and filtered, and the precipitate separated was washed and dried to obtain the desired compound (5) having $\lambda_{max}^{DMF}$ 430 nm.

EXAMPLE 4

Using a compound (30 parts) of the following formula (6),

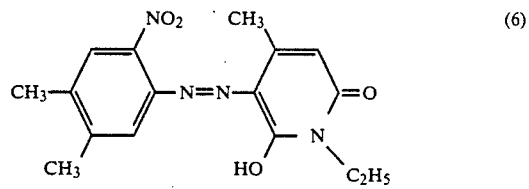
(6)

a dispersion liquid was obtained in a manner similar to that of a) in Example 1, and then spray-dried to obtain a dye powder (A).

The above manner was repeated, provided that a compound (30 parts) of the following formula (7),

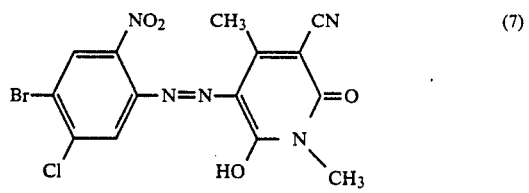
(7)

was used, therby obtaining a dye powder (B).

Using a disperse dye composition obtained by mixing the dye powder (A) (0.09 part) and the dye powder (B) (0.08 part), the dyeing was carried out in a manner similar to that of b) in Example 1, thereby obtaining dyed product of a brilliant deep yellow color superior in fastness properties. The dye bath stability thereof was found to be superior.

The compound of the formula (6) was obtained in a manner similar to that described in Example 3 for the production of the compound (5), provided that 4,5-dimethyl-2-nitroaniline and 1-ethyl-6-hydroxy-4-methylpyrid-2-one was used as the diazo and coupling components, respectively. Its $\lambda_{max}^{DMF}$ was found to be 438 nm.

The compound (7) was obtained likewise using 4-bromo-5-chloro-2-nitroaniline and 1,4-dimethyl-3-cyano-6-hydroxypyrid-2-one as the diazo and coupling components, repsectively. Its $\lambda_{max}$ was found to be 445 nm.

EXAMPLE 5

Using a disperse dye composition comprising compounds of the following formulas (8) to (10) in each amount of 10 parts,

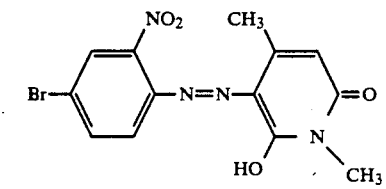 (8)

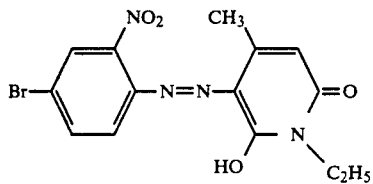 (9)

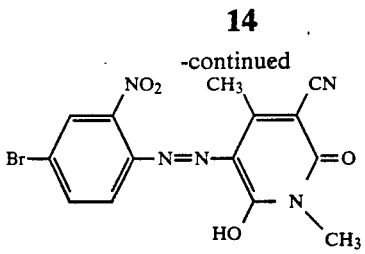 (10)

dyeing of polyester cloth was carried out in a manner similar to that of Example 1, thereby obtaining a dyed product of a brilliant deep greenish yellow color superior in fastness properties. The dye bath stability thereof was found to be superior.

The disperse dye composition used above was obtained in a manner similar to that described in Example 2 for the production of the compound (3), provided that 4-bromo-2-nitroaniline (22 parts) and a mixture of 1,4-dimethyl-6-hydroxypyrid-2-one (3.5 parts), 1-ethyl-6-hydroxy-4-methylpyrid-2-one (3.8 parts) and 3-cyano-1,4-dimethyl-6-hydroxypyrid-2-one (8.2 parts) were used as the diazo and coupling components, respectively.

EXAMPLES 6 to 61

Using the disperse dye composition comprising compounds (I) and (II) in a weight ratio as shown in the following Table 2, dyeing of polyester cloth was carried out to obtain a dyed product of a brilliant deep color shown in Table 2, which was superior in fastness properties.

Respective dye compositions showed superior dye bath stability.

TABLE 2

| Example No. | Pyridone monoazo compound (I) X¹ | X² | R¹ | λmax(nm) (in DMF) | Pyridone monoazo compound (II) X³ | X⁴ | R² | λmax(nm) (in DMF) | Weight ratio (I):(II) | Shade |
|---|---|---|---|---|---|---|---|---|---|---|
| 6 | H | H | $C_5H_{11}$-n | 432 | H | H | $CH_2CHC_4H_9$-n \| $C_2H_5$ | 437 | 50:50 | Greenish yellow |
| 7 | $CH_3$ | H | $CH_3$ | 436 | H | $CO_2-$ | $CH_3$ | 420 | 40:60 | " |
| 8 | $CH_3O$ | H | $CH_2CHC_4H_9$-n \| $C_2H_5$ | 458 | $CH_3O-$ | H | $CH_2CHC_4H_9$-n \| $C_2H_5$ | 472 | 95:5 | Reddish yellow |
| 9 | n-$C_4H_9O$ | H | $C_2H_5$ | 458 | " | H | " | " | 35:65 | " |
| 10 | $(CH_3)_2CH$ | H | $C_2H_4OCH_3$ | 436 | $(CH_3)_2CH$ | H | $C_2H_4OCH_3$ | 451 | 50:50 | Greenish yellow |
| 11 | $CH_3CO$ | H | $C_3H_7$-n | 431 | $CH_3CO$ | H | $C_3H_7$-n | 447 | " | " |
| 12 | n-$C_5H_{11}OCO$ | H | $C_2H_5$ | 430 | n-$C_5H_{11}OCO$ | H | $C_2H_5$ | 447 | 70:30 | " |
| 13 | $CH_2OCO$ | H | $C_4H_9$-n | 430 | " | H | " | " | 20:80 | " |
| 14 | $CH_3SO_4$ | H | $C_3H_6O$ | 429 | $CH_3SO_2$ | H | $C_3H_6O$ | 433 | 85:15 | " |
| 15 | $C_2H_5NHSO_2$ | H | $C_3H_6OCH_3$ | 432 | $C_2H_5NHSO_2$ | H | $C_3H_6OCH_3$ | 435 | 63:35 | " |
| 16 | $CH_3$ \| $C_2H_5CHNHSO_2$ | H | $CH_3$ | 433 | $C_2H_5NHSO_2$ | H | $C_3H_6OCH_3$ | 435 | 50:50 | Greenish yellow |
| 17 | $C_2H_5NHCO$ | H | $C_6H_{12}OH$ | 433 | $C_2H_5NHCO$ | H | $C_6H_{12}OH$ | 437 | 50:50 | " |
| 18 | NC— | H | $C_2H_4O$— | 431 | NC | H | $CH_3$ | 435 | 50:50 | " |
| 19 | I— | H | $C_2H_5$ | 431 | Br | H | $C_2H_5$ | 445 | 85:15 | " |
| 20 | F | H | $C_2H_4OCOCH_3$ | 429 | Br | H | $C_2H_4$—⌬ | 445 | 50:50 | " |
| 21 | ⌬—$SO_2$— | H | $CH_3$ | 429 | Cl | H | $C_4H_9$-n | 442 | 50:50 | " |

TABLE 2-continued

| Example No. | Pyridone monoazo compound (I) | | | | Pyridone monoazo compound (II) | | | | Weight ratio (I):(II) | Shade |
|---|---|---|---|---|---|---|---|---|---|---|
| | $X^1$ | $X^2$ | $R^1$ | $\lambda_{max}$(nm) (in DMF) | $X^3$ | $X^4$ | $R^2$ | $\lambda_{max}$(nm) (in DMF) | | |
| 22 | C$_6$H$_5$—OC$_3$H$_6$OCO | H | CH$_3$ | 430 | C$_6$H$_5$—OC$_3$H$_6$OCO | H | CH$_3$ | 445 | 60:40 | " |
| 23 | CH$_3$OC$_4$H$_8$OCO | H | CH$_3$ | 431 | " | " | " | " | 50:50 | " |
| 24 | n-C$_4$H$_9$OC$_2$H$_4$OCO | H | CH$_3$ | 431 | " | " | " | " | 50:50 | " |
| 25 | (CH$_3$)(C$_2$H$_5$)N—NCO | H | CH$_3$ | 433 | Cl | Cl | CH$_3$ | 445 | 30:70 | " |
| 26 | (4-CH$_3$-C$_6$H$_4$)SO$_2$ | H | CH$_3$ | 431 | (4-CH$_3$-C$_6$H$_4$)SO$_2$ | H | CH$_3$ | 435 | 60:40 | " |
| 27 | (3-Cl-C$_6$H$_4$)SO$_2$ | H | CH$_3$ | 427 | (3-Cl-C$_6$H$_4$)SO$_2$ | H | CH$_3$ | 433 | 60:40 | " |
| 28 | (4-Br-C$_6$H$_4$)SO$_2$ | H | CH$_3$ | 430 | (4-Br-C$_6$H$_4$)SO$_2$ | H | CH$_3$ | 433 | 60:40 | Greenish yellow |
| 29 | (C$_2$H$_5$)$_2$NSO$_2$ | H | CH$_3$ | 432 | (C$_2$H$_5$)$_2$NSO$_2$ | H | CH$_3$ | 435 | 60:40 | " |
| 30 | CH$_3$ | H | CH$_3$ | 438 | CH$_3$ | H | CH$_3$ | 453 | 80:20 | " |
| 31 | C$_2$H$_5$O | H | C$_2$H$_4$—C$_6$H$_5$ | 457 | C$_2$H$_5$O | H | C$_2$H$_4$—C$_6$H$_5$ | 472 | 50:50 | Reddish yellow |
| 32 | Br | H | C$_2$H$_4$O—C$_6$H$_{11}$ | 432 | Br | H | CH$_2$CH(C$_2$H$_5$)C$_4$H$_9$-n | 445 | 60:40 | Greenish yellow |
| 33 | Cl | H | CH$_2$—C$_6$H$_5$ | 429 | Cl | H | CH$_2$—C$_6$H$_5$ | 441 | 60:40 | " |
| 34 | H | H | C$_2$H$_4$OCH$_2$—C$_6$H$_5$ | 432 | H | H | C$_2$H$_4$OCO—C$_6$H$_4$—CH$_3$ | 436 | 65:35 | " |

TABLE 2-continued

| Example No. | Pyridone monoazo compound (I) | | | | λmax(nm) (in DMF) | Pyridone monoazo compound (II) | | | | λmax(nm) (in DMF) | Weight ratio (I):(II) | Shade |
|---|---|---|---|---|---|---|---|---|---|---|---|---|
| | X¹ | X² | R¹ | | | X³ | X⁴ | R² | | | | |
| 35 | H | H | C₂H₄O—⟨phenyl-Br,CH₃⟩ | | 432 | H | H | C₂H₄O—⟨phenyl-Br,CH₃⟩ | | 436 | 50:50 | " |
| 36 | H | H | C₂H₄OCH₂CH=CH₂ | | 434 | H | H | C₂H₄OCH₂CH=CH₂ | | 436 | 65:35 | Reddish yellow |
| 37 | CH₃O | H | C₂H₄CO₂C₂H₅ | | 456 | H | H | C₂H₄CO₂C₂H₅ | | 470 | 60:40 | " |
| 38 | CH₃O | H | C₂H₄NHSO₂CH₃ | | 458 | CH₃O | H | C₂H₄NHSO₂CH₃ | | 471 | 75:25 | " |
| 39 | H | H | C₂H₄OCOOC₃H₇ | | 431 | H | H | C₂H₄OCOOC₃H₇ | | 435 | 60:40 | Greenish yellow |
| 40 | H | H | C₂H₄NHCOCH₃ | | 430 | H | H | C₂H₄NHCOCH₃ | | 437 | 60:40 | Greenish yellow |
| 41 | Cl | H | C₂H₄OCONHC₄H₉ | | 431 | H | H | C₂H₄OCONHC₄H₉ | | 436 | 85:15 | " |
| 42 | Cl | H | CH₂CH=CH₂ | | 431 | Cl | H | CH₂CH=CH₂ | | 441 | 60:40 | " |
| 43 | Cl | H | ⟨cyclohexyl⟩ | | 431 | Cl | H | ⟨cyclohexyl⟩ | | 443 | 30:70 | " |
| 44 | Cl | H | NH—⟨phenyl⟩ | | 431 | Cl | H | NH—⟨phenyl⟩ | | 443 | 30:70 | " |
| 45 | H | H | CH₂—⟨phenyl-CH₃⟩ | | 432 | H | H | ⟨phenyl-CH₃⟩ | | 443 | 50:50 | " |
| 46 | H | Cl | C₂H₅, CH₃ | | 426 | H | Cl | C₂H₅, CH₃ | | 434 | 30:70 | " |
| 47 | H | Br | C₂H₅, CH₃ | | 426 | H | Br | C₂H₅, CH₃ | | 434 | 30:70 | " |
| 48 | H | CH₃ | CH₂CHC₄H₉-n, C₂H₅ | | 427 | H | CH₃ | CH₂CHC₄H₉-n, C₂H₅ | | 437 | 50:50 | " |
| 49 | H | (CH₃)₂CH | C₃H₆O—⟨phenyl⟩ | | 427 | H | (CH₃)₂CH | C₃H₆O—⟨phenyl⟩ | | 436 | 60:40 | " |
| 50 | H | CH₃O | C₆H₁₂OH | | 430 | H | CH₂=CHCH₂O | C₆H₁₂OH | | 441 | 60:40 | " |
| 51 | H | C₄H₉O | CH₂—⟨phenyl⟩ | | 431 | H | C₄H₉O | C₂H₄—⟨phenyl⟩ | | 442 | 50:50 | " |
| 52 | H | CH₃SO₂ | CH₂CO₂C₄H₉-n | | 414 | H | CH₃SO₂ | CH₂CO₂C₄H₉-n | | 421 | 70:30 | Greenish yellow |
| 53 | H | ⟨phenyl⟩SO₂ | C₂H₄CN | | 413 | H | ⟨phenyl⟩SO₂ | C₂H₄CN | | 420 | 80:20 | " |

TABLE 2-continued

| Example No. | Pyridone monoazo compound (I) | | | | λmax(nm) (in DMF) | Pyridone monoazo compound (II) | | | | λmax(nm) (in DMF) | Weight ratio (I):(II) | Shade |
|---|---|---|---|---|---|---|---|---|---|---|---|---|
| | $X^1$ | $X^2$ | | $R^1$ | | $X^3$ | $X^4$ | | $R^2$ | | | |
| 54 | Cl | –O–C₆H₅ | | C₃H₆O–C₆H₅ | 432 | Cl | Cl | | C₃H₆O–C₆H₅ | 445 | 40:60 | " |
| 55 | Br | Br | | C₂H₅ | 431 | Cl | Cl | | C₂H₅ | 445 | 15:85 | " |
| 56 | NC | Br | | CH₂CHC₄H₉-n<br>C₂H₅ | 429 | NC | Br | | CH₂CHC₄H₉-n<br>C₂H₅ | 438 | 60:40 | " |
| 57 | Br | C₆H₅SO₂– | | CH₃ | 426 | Br | –SO₂C₆H₅ | | CH₃ | 433 | 50:50 | " |
| 58 | CH₃O | CH₃O | | C₄H₉OCOC₂H₅ | 459 | Br | H | | C₄H₉-n | 444 | 60:40 | Reddish yellow |
| 59 | Cl | SO₂C₂H₅ | | C₂H₄OCOC₂H₅ | 424 | Cl | SO₂C₂H₅ | | C₂H₄NHCOCH₃ | 432 | 60:40 | Greenish yellow |
| 60 | Br | Cl | | CH₂CH=CH₂ | 431 | Br | Cl | | CH₂CH=CH₂ | 445 | 60:40 | " |
| 61 | I | Cl | | C₆H₅ | 433 | I | Cl | | C₆H₅ | 446 | 80:20 | " |

EXAMPLE 62

Using the disperion liquid obtained in Example 1 a), a printing paste having the following composition was obtained.

| Dispersion liquid obtained | 3 parts |
| --- | --- |
| Half emulsion stock paste* | 60 parts |
| Tartaric acid | 0.3 part |
| Sodium chlorate | 0.2 part |
| Water | balance |
| Total | 100 parts |

Note
*The stock paste was prepared by mixing kerosene (70 parts), water (25 parts) and an emulsifer (5 parts, Viskon KM-8, a product of Shinnakamura Chemical Co., Japan) in a high speed mixer to obtain en emulsion and mixing the resulting emulsion (30 parts) with Maypro gum NP 12% paste (70 parts, a product of Gruenau Corp.).

The printing paste was applied by hand to polyester cloth. The cloth was dried, subjected to superheated steaming for 7 minutes at 175° C., and then washed and dried in each conventional manner to obtain a printed product of a brilliant greenish yellow color superior in fastness properties.

EXAMPLE 63

Using the dispersion liquid (0.63 part) obtained in Example 1 a) and Sumikaron Turquoise Blue S-GL (2.2 parts, C.I. Disperse Blue 60, a product of Sumitomo Chemical Co., Japan), polyester woven fabric was dyed in a manner similar to that of Example 1 b), thereby obtaining a dyed product of a brilliant, deep and uniform green superior in fastness properties, particularly those such as light fastness.

EXAMPLE 64

Using the dispersion liquid (0.86 part) obtained in Example 1 a) and Resolin Blue BBLS (0.15 part, C.I. Disperse Blue 165, a product of Bayer A.G., Germany), polyester woven fabric was dyed in a manner similar to that of Example 1 b), thereby obtaining a dyed product of a brilliant, deep and uniform green color superior in fastness properties, particularly those such as light fastness.

EXAMPLE 65

Using the dispersion liquid (0.89 part) obtained in Example 1 a) and Resolin Red F3ES (0.6 part, C.I. Disperse Red 343, a product of Bayer A.G., Germany), polyester woven fabric was dyed in a manner similar to that of Example 1 b), thereby obtaining a dyed product of a brilliant, deep and uniform scarlet color superior in fastness properties, particularly those such as light fastness.

EXAMPLE 66 a) Prepartion of disperse dye powder

The compound (7 parts) of the formula (1), the compound (17 parts) of the formula (2) and a compound (12 parts) represented by the following formula (11),

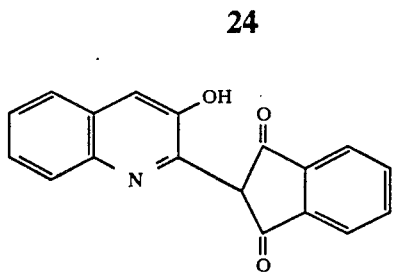

were mixed with ligninsulfonic acid (64 parts) and water (230 parts), and the resulting mixture was treated for 10 hours in a sand mill. Then, the liquid obtained was spray-dried to obtain a disperse dye powder.

b) Dyeing of polyester

The disperse dye powder (0.5 part) obtained above and water (3000 parts) were placed in a pot, and the content was adjusted to pH 5 using acetic acid. Polyester woven fabric (100 parts) was dipped therein. Dyeing was continued for 60 minutes at 130° C. Thereafter, the fabric taken out was rinsed in a conventional manner and then dried to obtain a dyed product of a brilliant deep greenish yellow color superior in fastness properties such as light fastness.

The dye composition used above was found to be superior in the dye bath stability and level dyeing property. Moreover, the reproductivity was satisfactory so that there was observed almost no difference in the dyeing results.

EXAMPLES 67 to 69

The compounds of the formulas (1), (2) and (11) were mixed with each other in each mixing weight ratio shown in the following Table 3, thereby obtaining each disperse dye composition. Polyester woven fabric was dyed using the dye composition in a manner similar to that of Example 66 b) to obtain each dyed product of a brilliant deep yellow color superior in fastness properties such as light fastness.

Moreover, the dye bath stability and level dyeing property thereof were found to be superior, and the reproductivity was also satisfactory so that there was observed almost no difference in the dyeing results.

TABLE 3

| Compound of formula | (1) parts | (2) parts | (11) parts |
| --- | --- | --- | --- |
| Example 67 | 7 | 19 | 8 |
| Example 68 | 12.5 | 12 | 12 |
| Example 69 | 14 | 13 | 8 |

EXAMPLES 70 to 73

Example 66 was repeated, provided that a compound represented by the following formula (12),

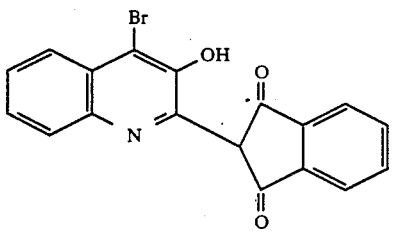

was used in place of the compound of the formula (11), ligninsulfonic acid was used in an amount of 69 parts, and the mixing weight ratio was as shown in the following Table 4, thereby obtaining a dyed product of a brilliant deep yellow color superior in fastness properties such as light fastness.

The dye bath stability and level dyeing property of each dye composition were found to be superior, and the reproductivity was also satisfactory.

TABLE 4

| Compound of formula | (1) parts | (2) parts | (12) parts |
|---|---|---|---|
| Example 70 | 6.5 | 15 | 9 |
| Example 71 | 6.5 | 18 | 6 |
| Example 72 | 11 | 10.5 | 9 |
| Example 73 | 13 | 12 | 6 |

EXAMPLES 74 to 78

Example 66 was repeated, provided that each compound of the aforesaid formula (IV), wherein Y and $Y^1$ are as shown in the following Table 5 was used in place of the compound of the formula (11), and the mixing weight ratio was also as shown in the following Table 5, thereby obtaining each dyed product of a brilliant deep yellow color superior in fastness properties such as light fastness.

The dye bath stability and level dyeing property of these dye compositions were found to be superior, and the reproductivity was satisfactory.

TABLE 5

| Example No. | Formula (IV) Y | $Y^1$ | Mixing weight ratio (parts) (1) | (2) | (IV) |
|---|---|---|---|---|---|
| 74 | H | H | 6.5 | 15 | 8 |
| 75 | Br | CON(C$_2$H$_5$)$_2$ | 6.5 | 15 | 11 |
| 76 | H | CON(n-C$_4$H$_9$)$_2$ | 6.5 | 18 | 7 |
| 77 | Br | CO$_2$CH$_3$ | 11 | 10.5 | 10.5 |
| 78 | H | CO$_2$CH(CH$_3$)$_2$ | 13 | 12 | 6 |

EXAMPLE 79

Example 66 was repeated, provided that the compound (10 parts) of the formula (5) and a compound (17 parts) of the following formula (13) in place of the compounds of the formulas (1) and (2), respectively, and the compound (12 parts) of the formula (11) were used, thereby obtaining a dyed product of a brilliant deep yellow color superior in fastness properties, particularly those such as light fastness.

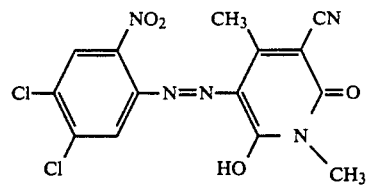

The dye bath stability and level dyeing property of the dye composition were found to be superior, and the reproductivity was also satisfactory.

EXAMPLE 80

Example 66 was repeated, provided that a compound (7 parts) of the following formula (14) and a compound (17 parts) of the following formula (15) in place of the compounds of the formulas (1) and (2), respectively, and the compound (12 parts) of the formula (11) were used, thereby obtaining a dyed product of a brilliant deep yellow color superior in fastness properties such as light fastness.

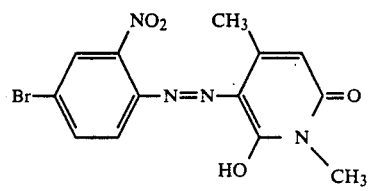

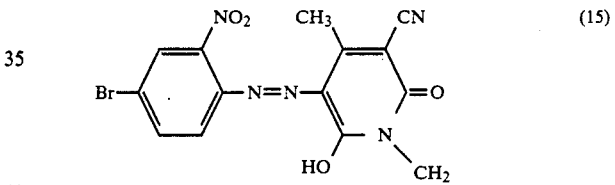

The dye bath stability and level dyeing property of the dye composition were found to be superior, and the reproductivity was also satisfactory.

EXAMPLES 81 to 136

The compounds of the aforementioned formulas (I) and (II) wherein $X^1$, $X^2$, $R^1$, $X^3$, $X^4$ and $R^2$ are as shown in the following Table 6 and the compound of the formula (11) were mixed in the mixing weight ratio shown also in the following Table 6 to obtain each disperse dye composition. Using each disperse dye composition (36 parts), the dyeing of polyester woven fabric was carried out in a manner similar to that of Example 66 to obtain each dyed product of a brilliant deep color as shown in the following Table 6, which color was superior in fastness properties such as light fastness.

The dye bath stability and level dyeing property of these dye compositions were found to be superior, and the reproductivity was also satisfactory so that there was observed almost no difference in the repeated dyeing results.

TABLE 6

| Example No. | Pyridone monoazo compound (I) | | | | Pyridone monoazo compound (II) | | | | Weight ratio (I):(II):(11) | Shade |
|---|---|---|---|---|---|---|---|---|---|---|
| | $X^1$ | $X^2$ | $R^1$ | | $X^3$ | $X^4$ | $R^2$ | | | |
| 81 | H | H | $C_5H_{11}$-n | | H | H | $CH_2CHC_4H_9$-n<br>$\|$<br>$C_2H_5$ | | 40:40:20 | Greenish yellow |
| 82 | $CH_3$ | H | $CH_3$ | | H | ⌬–$SO_2$ | $CH_3$ | | 20:30:50 | Greenish yellow |
| 83 | $CH_3O$ | H | $CH_2CHC_4H_9$-n<br>$\|$<br>$C_2H_5$ | | $CH_3O-$ | H | $CH_2CHC_4H_9$-n<br>$\|$<br>$C_2H_5$ | | 10:55:35 | Reddish yellow |
| 84 | n-$C_4H_9O$ | H | $C_2H_5$ | | " | " | " | | 5:85:10 | Reddish yellow |
| 85 | $(CH_3)_2CH$ | H | $C_2H_4OCH_3$ | | $(CH_3)_2CH$ | H | $C_2H_4OCH_3$ | | 30:30:40 | Greenish yellow |
| 86 | $CH_3CO$ | H | $C_3H_7$-n | | $CH_3CO$ | H | $C_3H_7$-n | | 35:35:30 | Greenish yellow |
| 87 | n-$C_5H_{11}OCO$ | H | $C_2H_5$ | | n-$C_5H_{11}OCO$ | H | $C_2H_5$ | | 35:15:50 | Greenish yellow |
| 88 | ⌬–$CH_2OCO$ | H | $C_4H_9$-n | | n-$C_5H_{11}OCO$ | H | $C_2H_5$ | | 10:65:25 | Greenish yellow |
| 89 | $CH_3SO_2$ | H | $C_3H_6O$–⌬ | | $CH_3SO_2$ | H | $C_3H_6O$–⌬ | | 60:15:25 | Greenish yellow |
| 90 | $C_2H_5NHSO_2$ | H | $C_3H_6OCH_3$ | | $C_2H_5NHSO_2$ | H | $C_3H_6OCH_3$ | | 50:30:20 | Greenish yellow |
| 91 | $CH_3$<br>$\|$<br>$C_2H_5CHNHSO_2$ | H | $CH_3$ | | " | H | " | | 25:25:50 | Greenish yellow |
| 92 | $C_2H_5NHCO$ | H | $C_6H_{12}OH$ | | $C_2H_5NHCO$ | H | $C_6H_{12}OH$ | | 40:40:20 | Greenish yellow |
| 93 | NC— | H | $C_2H_4O$–⌬(H) | | NC | H | $CH_3$ | | 30:30:40 | Greenish yellow |

TABLE 6-continued

| Example No. | Pyridone monoazo compound (I) | | | Pyridone monoazo compound (II) | | | | Weight ratio (I):(II):(11) | Shade |
|---|---|---|---|---|---|---|---|---|---|
| | $X^1$ | $X^2$ | $R^1$ | $X^3$ | $X^4$ | $R^2$ | | | |
| 94 | I— | H | $C_2H_5$ | Br | H | $C_2H_5$ | | 90:5:5 | Greenish yellow |
| 95 | F | H | $C_2H_4OCOCH_3$ | Br | H | $-C_2H_4-\bigcirc$ | | 30:30:40 | Greenish yellow |
| 96 | $\bigcirc\!-\!SO_2-$ | H | $CH_3$ | Cl | H | $C_4H_9\text{-}n$ | | 35:35:30 | Greenish yellow |
| 97 | $CH_3OC_4H_8OCO-$ | H | $CH_3$ | $\bigcirc\!-\!OC_3H_6OCO-$ | H | $CH_3$ | | 40:30:30 | Greenish yellow |
| 98 | $CH_3OC_4H_8OCO-$ | H | $CH_3$ | " | H | $CH_3$ | | 45:45:10 | Greenish yellow |
| 99 | $n\text{-}C_4H_9OC_2H_4OCO-$ | H | $CH_3$ | " | H | $CH_3$ | | 15:35:50 | Greenish yellow |
| 100 | $(CH_3)(CH_3)N\text{-}CO-$ | H | $CH_3$ | Cl | Cl | $CH_3$ | | 30:25:45 | Greenish yellow |
| 101 | $CH_3\!-\!\bigcirc\!-\!SO_2-$ | H | $CH_3$ | $CH_3\!-\!\bigcirc\!-\!SO_2-$ | H | $CH_3$ | | 35:20:45 | Greenish yellow |
| 102 | $Cl\!-\!\bigcirc\!-\!SO_2-$ | H | $CH_3$ | $Cl\!-\!\bigcirc\!-\!SO_2-$ | H | $CH_3$ | | 40:25:35 | Greenish yellow |

TABLE 6-continued

| Example No. | Pyridone monoazo compound (I) X¹ | X² | R¹ | Pyridone monoazo compound (II) X³ | X⁴ | R² | Weight ratio (I):(II):(11) | Shade |
|---|---|---|---|---|---|---|---|---|
| 103 | 4-Br-C₆H₄-SO₂- | H | CH₃ | 4-Br-C₆H₄-SO₂- | H | CH₃ | 50:35:10 | Greenish yellow |
| 104 | (C₂H₅)₂NSO₂ | H | CH₃ | (C₂H₅)₂NSO₂ | H | CH₃ | 50:35:15 | Greenish yellow |
| 105 | CH₃ | H | C₂H₄-C₆H₅ | CH₃ | H | C₂H₄-C₆H₅ | 60:15:25 | Greenish yellow |
| 106 | C₂H₅O | H | C₂H₄O-C₆H₅ | C₂H₅O | H | CH₂CHC₄H₉-n \| C₂H₅ | 30:30:40 | Reddish yellow |
| 107 | Br | H | CH₂-C₆H₅ | Br | H | CH₂-C₆H₅ | 30:20:50 | Greenish yellow |
| 108 | Cl | H | C₂H₄OCH₂-C₆H₅ | Cl | H | C₂H₄OCH₂-C₆H₅ | 60:30:10 | Greenish yellow |
| 109 | H | H | C₂H₄OCH-(4-CH₃-C₆H₄) | H | H | C₂H₄OCH-(4-CH₃-C₆H₄) | 60:20:20 | Greenish yellow |
| 110 | H | H | C₂H₄O-(3-Br-C₆H₄) | H | H | C₂H₄O-(3-Br-C₆H₄) | 25:25:50 | Greenish yellow |
| 111 | H | H | C₂H₄OCH₂CH=CH₂ | H | H | C₂H₄OCH₂CH=CH₂ | 50:15:35 | Greenish yellow |
| 112 | CH₃O | H | C₂H₄CO₂C₂H₅ | CH₃O | H | C₂H₄CO₂C₂H₅ | 50:30:20 | Reddish yellow |

TABLE 6-continued

| Example No. | Pyridone monoazo compound (I) | | | Pyridone monoazo compound (II) | | | Weight ratio (I):(II):(11) | Shade |
|---|---|---|---|---|---|---|---|---|
| | $X^1$ | $X^2$ | $R^1$ | $X^3$ | $X^4$ | $R^2$ | | |
| 113 | $CH_3O$ | H | $C_2H_4NHSO_2CH_3$ | $CH_3O$ | H | $C_2H_4NHSO_2CH_3$ | 60:20:20 | Reddish yellow |
| 114 | H | H | $C_2H_4OCOOC_3H_7$ | H | H | $C_2H_4OCOOC_3H_7$ | 40:20:40 | Greenish yellow |
| 115 | H | H | $C_2H_4NHCOCH_3$ | H | H | $C_2H_4NHCOCH_3$ | 50:35:15 | Greenish yellow |
| 116 | H | H | $C_2H_4OCONHC_4H_9$ | H | H | $C_2H_4OCONHC_4H_9$ | 35:15:50 | Greenish yellow |
| 117 | Cl | H | $CH_2CH=CH_2$ | Cl | H | $CH_2CH=CH_2$ | 50:30:20 | Greenish yellow |
| 118 | Cl | H | cyclohexyl | Cl | H | cyclohexyl | 15:65:20 | Greenish yellow |
| 119 | Cl | H | $C_6H_4NH$- (anilino) | H | H | $C_6H_4NH$- (anilino) | 20:50:30 | Greenish yellow |
| 120 | H | H | 4-methylphenyl | H | H | 4-methylphenyl | 35:35:30 | Greenish yellow |
| 121 | H | Cl | $C_2H_5$ | H | Cl | $C_2H_5$ | 20:55:25 | Greenish yellow |
| 122 | H | Br | $CH_3$ | H | Br | $CH_3$ | 15:80:5 | Greenish yellow |
| 123 | H | $CH_3$ | $CH_2CHC_4H_{9\text{-}n}$ $\mid$ $C_2H_5$ | H | $CH_3$ | $CH_2CHC_4H_{9\text{-}n}$ $\mid$ $C_2H_5$ | 30:30:40 | Greenish yellow |
| 124 | H | $(CH_3)_2CH$ | $C_3H_6O$-phenyl | H | $(CH_3)_2CH$ | $C_3H_6O$-phenyl | 60:30:10 | Greenish yellow |
| 125 | H | $CH_3O$ | $C_6H_{12}OH$ | H | $CH_2=CHCH_2O$ | $C_6H_{12}OH$ | 30:20:50 | Greenish yellow |

TABLE 6-continued

| Example No. | Pyridone monoazo compound (I) X¹ | X² | R¹ | Pyridone monoazo compound (II) X³ | X⁴ | R² | Weight ratio (I):(II):(11) | Shade |
|---|---|---|---|---|---|---|---|---|
| 126 | H | $C_4H_9O$ | $CH_2$–Ph | H | $C_4H_9O$ | $C_2H_4$–Ph | 45:45:10 | Greenish yellow |
| 127 | H | $CH_3SO_2$ | $CH_2CO_2C_4H_9$-n | H | $CH_3SO_2$ | $CH_2CO_2C_4H_9$-n | 60:25:15 | Greenish yellow |
| 128 | H | Ph–$SO_2$ | $C_2H_4CN$ | H | Ph–$SO_2$ | $C_2H_4CN$ | 60:15:25 | Greenish yellow |
| 129 | Cl | Ph–O | $C_3H_6O$–Ph | Cl | Cl | $C_3H_6O$–Ph | 20:30:50 | Greenish yellow |
| 130 | Br | Br | $C_2H_5$ | Cl | Cl | $C_2H_5$ | 15:65:20 | Greenish yellow |
| 131 | NC | Br | $CH_2CHC_4H_9$-n / $C_2H_5$ | NC | Br | $CH_2CHC_4H_9$-n / $C_2H_5$ | 35:15:50 | Greenish yellow |
| 132 | Br | Ph–$SO_2$ | $CH_3$ | Br | Ph–$SO_2$ | $CH_3$ | 25:25:50 | Greenish yellow |
| 133 | $CH_3O$ | $CH_3O$ | $C_4H_9$-n | Br | H | $C_4H_9$-n | 40:30:30 | Reddish yellow |
| 134 | Cl | $SO_2C_2H_5$ | $C_2H_4OCOC_2H_5$ | Cl | $SO_2C_2H_5$ | $C_2H_4NHCOCH_3$ | 50:40:10 | Greenish yellow |
| 135 | Br | Cl | $CH_2CH=CH_2$ | Br | Cl | $CH_2CH=CH_2$ | 60:30:10 | Greenish yellow |
| 136 | I | Cl | Ph | I | Cl | Ph | 50:15:35 | Greenish yellow |

EXAMPLE 137

Using the disperse dye powder obtained in Example 66 a), a printing paste having the following composition was obtained.

| Disperse dye powder obtained | 1.2 parts |
| --- | --- |
| Half emulsion stock paste* | 60 parts |
| Tartaric acid | 0.3 part |
| Sodium chlorate | 0.2 part |
| Water | balance |
| Total | 100 parts |

Note
*The stock paste was prepared by mixing kerosene (70 parts), water (25 parts) and an emulsifer (5 parts, Viskon KM-8, a product of Shinnakamura Chemical Co., Japan) in a high speed mixer to obtain an emulsion and mixing the resulting emulsion (30 parts) with Maypro gum 12% paste (70 parts, a product of Grueneau Corp.).

The printing paste was applied by hand to polyester cloth. The cloth was dried, subjected to superheated steaming for 7 minutes at 175° C., and then washed and dried in each conventional manner to obtain a printed product of a brilliant yellow color superior in fastness properties.

EXAMPLE 138

Using the disperse dye powder (0.25 part) obtained in Example 66 a) and Sumikaron Turquoise Blue S-GL (2.2 parts, C.I. Disperse Blue 60, a product of Sumitomo Chemical Co., Japan), polyester woven fabric was dyed in a manner similar to that of Example 66 b), thereby obtaining a dyed product of a brilliant, deep and uniform green superior in fastness properties, particularly, those such as light fastness.

EXAMPLE 139

Using the disperse dye powder (0.34 part) obtained in Example 66 a) and Resolin Blue BBLS (0.15 part, C.I. Disperse Blue 165, a product of Bayer A.G., Germany), polyester woven fabric was dyed in a manner similar to that of Example 66 b), thereby obtaining a dyed product of a brilliant, deep and uniform green color superior in fastness properties, particularly those such as light fastness.

EXAMPLE 140

Using the disperse dye powder (0.35 part) obtained in Example 66 a) and Resolin Red F3BS (0.6 part, C.I. Disperse Red 343, a product of Bayer A.G., Germany), polyester woven fabric was dyed in a manner similar to that of Example 66 b), thereby obtaining a dyed product of a brilliant, deep and uniform scarlet color superior in fastness properties, particularly those such as light fastness.

EXAMPLE 141

The compound (7.1 parts) of the formula (1), the compound (4.7 parts) of the formula (2), C.I. Disperse Red 60 (8.7 parts) and C.I. Disperse Blue 56 (4.5 parts) were mixed with a dispersing agent (75 parts) of naphthalenesulfonic acid / formalin condensate to obtain a disperse dye composition.

Using the obtained disperse dye composition (1.7 parts) and Sumipon TF (a product of Sumitomo Chemical Co., Japan), a brown dye bath (1500 parts) was prepared in a conventional manner. The dye bath stability thereof was found to be superior.

For the comparison purpose, the above procedure was repeated, provided that C.I. Disperse Yellow 211 only was used in place of both compounds (1) and (2).

As a result, the dye bath stability was poor so that the color of the dyed product to be tested was greatly changed in comparison with that of standard dyed product.

EXAMPLE 142

The compound (2.1 parts) of the formula (8), the compound (4.3 parts) of the formula (10), C.I. Disperse Red 60 (8.0 parts) and C.I. Disperse Blue 56 (12.7 parts) were mixed with a dispersing agent (75 parts) of ligninsulfonic acid to obtain a disperse dye composition.

Using the obtained disperse dye composition (0.4 part), Sumipon TF (1.5 parts), acetic acid (0.6 part) and sodium acetate (2.4 parts), a gray dye bath (1500 parts) was prepared in a conventional manner. The dye bath stability thereof was found to be superior, and light fastness measured on the standard dyed product according to JIS L-0842 (carbon arc lump, 80 hour exposure) was found to be 5–6 in grade.

EXAMPLE 143

The compound (2.3 parts) of the formula (1), the compound (5.6 parts) of the formula (2), the compound (3.9 parts) of the formula (11), C.I. Disperse Red 60 (8.7 parts) and C.I. Disperse Blue 56 (4.5 parts) were mixed with a dispersing agent (75 parts) of a naphthalenesulfonic acid/formalin condensate to obtain a disperse dye composition.

Using the obtained disperse dye composition (1.7 parts) and Sumipon TF (1.5 parts), a brown dye bath (1500 parts) was prepared in a conventional manner. The dye bath stability thereof was found to be superior, and light fastness of a dyed product obtained using the dye bath was also found to be superior.

EXAMPLE 144

The compound (6 parts) of the formula (5) and the compound (24 parts) of the formula (13) were mixed with a dispersing agent (70 parts) of ligninsulfonic acid to obtain a disperse dye composition. Using the disperse dye composition (0.1 part), C.I. Disperse Red 60 (0.07 part, Sumikaron Red E-FBL, a product of Sumitomo Chemical Co., Japan), C.I. Disperse Blue 56 (0.03 part, Sumikaron Blue E-FBL, a product of the above said company), acetic acid (0.6 part), sodium acetate (2.4 parts) and Sumipon TF (1.5 parts), a beige dye bath (1500 parts) was prepared. In six pots of the thus prepared dye bath, polyester thin woven fabrics were dipped respectively. Three pots of the dye bath were put on each of two dyeing machines (Color pet dyeing machine manufactured by Nippon Senshokukikai Co.), and dyeing was carried out for 20 minutes at 130° C. Each fabric taken out was reduction-rinsed, washed with water and then dried to obtain six pieces of dyed product of a beige color. Each dyed product had no dyeing speck and there was observed no difference in their color depth and shade. This demonstrated satisfactory reproductivity.

We claim:
1. A disperse dye composition comprising:
    (a) one or more members selected form pyridone monoazo compounds represented by the following formula (I), and their tautomers,

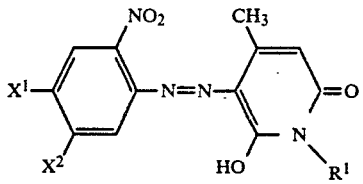

(I)

wherein $X^1$ and $X^2$ independently of one another are each a hydrogen atom, a halogen atom, an alkyl group, an alkoxy group an alkoxycarbonyl group unsubstituted or substituted by an alkoxy group having 1 to 4 carbon atoms, a phenyl group or a phenoxy group, an alkylcarbonyl group, an alkylsufonyl group, an arylsulfonyl group, an unsubstituted or alkyl-substituted carbamoyl or sulfamoyl group or cyano group, and $R^1$ is an alkyl group unsubstituted or substituted by chlorine, bromine, hydroxy, or a group of the following formula

wherein Z is a hydrogen atom, a halogen atom, an alkyl group having 1 to 4 carbon atoms or an alkoxy group having 1 to 4 carbon atoms, or the following formula, —OR, —OCOR, —OCOOR, —COOR,
—NHSO$_2$R, —NHCOR or —OCONHR wherein R is an alkyl group having 1 to 4 carbon atoms, an alkenyl group having 3 to 5 carbon atoms, an alkoxyalkyl group having 1 to 4 carbon atoms, or a cycloalkyl group having 5 to 6 carbon atoms which is unsubstituted or substituted by an alkyl group having 1 to 4 carbon atoms, or the following formula,

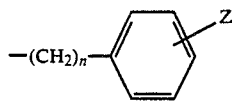

wherein Z is as defined above and n is 0 or an integer of 1 to 3, an alkenyl group or a cycloalkyl group unsubstituted or substituted by an alkyl group having 1 to 4 carbon atoms, phenyl or anilino group; and (b) one or more members selected from pyridone monoazo compounds represented by the following formula (II), and their tautomers,

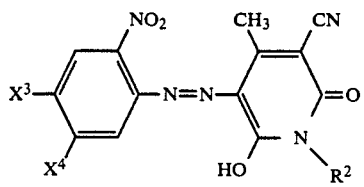

(II)

wherein $X^3$ and $X^4$ independently of one another are each a hydrogen atom, a halogen atom, an alkyl group, an alkoxy group an alkoxycarbonyl group unsubstituted or substituted by an alkoxy group having 1 to 4 carbon atoms, a phenyl group or a phenoxy group, an alkylcarbonyl group, an alkylsufonyl group, an arylsulfonyl group, an unsubstituted or alkyl-substituted carbamoyl or sulfamoyl group or cyano group, and $R^2$ is an alkyl group unsubstituted or substituted by chlorine, bromine, hydroxy, or a group of the following formula

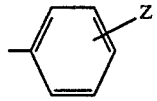

wherein Z is a hydrogen atom, a halogen atom, an alkyl group having 1 to 4 carbon atoms or an alkoxy group having 1 to 4 carbon atoms, or the following formula, —OR, —OCOR, —OCOOR, —COOR,
—NHSO$_2$R, —NHCOR or —OCONHR wherein R is an alkyl group having 1 to 4 carbon atoms, an alkenyl group having 3 to 5 carbon atoms, an alkoxyalkyl group having 1 to 4 carbon atoms, or a cycloalkyl group having 5 to 6 carbon atoms which is unsubstituted or substituted by an alkyl group having 1 to 4 carbon atoms, or the following formula,

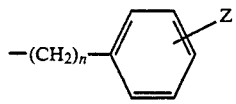

wherein Z is as defined above and n is 0 or an integer of 1 to 3, an alkenyl group or a cylcoalkyl group unsubstituted or substituted by an alkyl group having 1 to 4 carbon atoms, phenyl or anilino group.

2. The composition according to claim 1, wherein $X^1$ and $X^2$ independently of one another are each chlorine, bromine, C$_1$ to C$_4$ alkyl, C$_1$ to C$_4$ alkoxy, C$_1$ to C$_4$ alkylsulfonyl or phenylsulfony, and $R^1$ is unsubstituted C$_1$ to C$_8$ alkyl, cyano-substituted C$_1$ to C$_4$ alkyl, allyl, benzyl, phenethyl, —OR$^3$, —OCOR$^3$ or —CO$_2$R$^3$ in which R$^3$ is C$_1$ to C$_4$ alkyl, allyl or phenyl.

3. The composition according to claim 1, wherein any one of $X^1$ and $X^2$ is hydrogen, the other is chlorine, bromine, C$_1$ to C$_4$ alkyl, C$_1$ to C$_4$ alkoxy, C$_1$ to C$_4$ alkylsulfonyl or phenylsulfonyl, and $R^1$ is unsubstituted C$_1$ to C$_8$ alkyl, cyano-substituted C$_1$ to C$_4$ alkyl, allyl, benzyl, phenethyl, —OR$^3$, —OCOR$^3$ or —CO$_2$R$^3$ in which R$^3$ is C$_1$ to C$_4$ alkyl, allyl or phenyl.

4. The composition according to claim 1, wherein $X^1$ is chlorine or bromine, $X^2$ is hydrogen, and $R^1$ is methyl, ethyl, propyl or butyl.

5. The composition according to claim 1, wherein $X^1$ is chlorine or bromine, $X^2$ is chlorine, and $R^1$ is methyl or ethyl.

6. The composition according to claim 1, wherein $X^3$ and $X^4$ independently of one another are each chlorine, bromine, C$_1$ to C$_4$ alkyl, C$_1$ to C$_4$ alkoxy, C$_1$ to C$_4$ alkylsulfonyl or phenylsulfonyl, and $R^2$ is unsubstituted C$_1$ to C$_8$ alkyl, cyano-substituted C$_1$ to C$_4$ alkyl, allyl, benzyl, phenethyl, —OR$^3$, —OCOR$^3$ or —CO$_2$R$^3$ in which R$^3$ is C$_1$ to C$_4$ alkyl, allyl or phenyl.

7. The composition according to claim 1, wherein any one of $X^3$ and $X^4$ is hydrogen, the other is chlorine, bromine, C$_1$ to C$_4$ alkyl, C$_1$ to C$_4$ alkoxy, C$_1$ to C$_4$ alkylsulfonyl or phenylsulfonyl, and $R^2$ is unsubstituted $C_1$ to $C_8$ alkyl, cyano-substituted $C_1$ to $C_4$ alkyl, allyl, benzyl, phenethyl, —$OR^3$, —$OCOR^3$ or —$CO_2R^3$ in which $R^3$ is $C_1$ to $C_4$ alkyl, allyl or phenyl.

8. The composition according to claim 1, wherein $X^3$ is chlorine, bromine, methyl or propyl, $X^4$ is hydrogen, and $R^2$ is methyl, ethyl, propyl or butyl.

9. The composition according to claim 1, wherein $X^3$ is chlorine or bromine, $X^4$ is chlorine, and $R^2$ is methyl or ethyl.

10. The composition according to claim 1, wherein a mixing weight ratio of (a):(b) is selected from a range of 99 to 1:1 to 99.

11. The composition according to claim 1, wherein the composition additionally comprises at least one member selected from C.I. Disperse Red 60 and C.I. Disperse Blue 56.

12. The composition according to claim 1, wherein the composition additionally comprises (c) one or more members selected from quinophthalone compounds represented by the following formula (III),

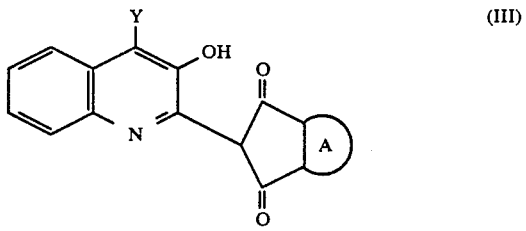

wherein Y is a hydrogen atom or a bromine atom, and the ring A is a benzene or naphthalene ring unsubstituted or substituted by an unsubstituted or alkyl-substituted carbamoyl group or an alkoxycarbonyl group.

13. The composition according to claim 12, wherein the quinophthalone compound is one represented by the following formula (IV),

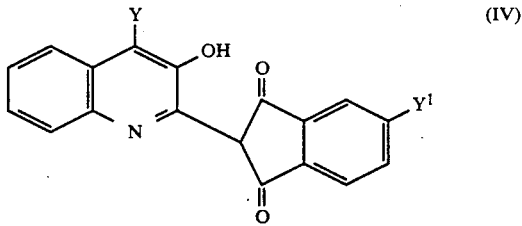

wherein Y is as defined in claim 12, and $Y^1$ is hydrogen, carbamoyl unsubstituted or substituted by $C_1$ to $C_4$ alkyl, or $C_1$ to $C_4$ alkoxycarbonyl.

14. The composition according to claim 12, wherein a mixing weight ratio of (a):(b):(c) is selected from a range of 5 to 90:5 to 90:5 to 90.

15. The composition according to claim 12, wherein the composition additionally comprises at least one member selected from C.I. Disperse Red 60 and C.I. Disperse Blue 56.

16. A process for dyeing or printing hydrophobic fiber materials, which comprises using the disperse dye composition defined in claim 1.

17. Hydrophobic fiber materials dyed or printed by the process defined in claim 17.

18. A process for dyeing or printing hydrophobic fiber materials, which comprises using the disperse dye composition defined in claim 2.

19. A process for dyeing or printing hydrophobic fiber materials, which comprises using the disperse dye composition defined in claim 3.

20. A process for dyeing or printing hydrophobic fiber materials, which comprises using the disperse dye composition defined in claim 4.

21. A process for dyeing or printing hydrophobic fiber materials, which comprises using the disperse dye composition defined in claim 5.

22. A process for dyeing or printing hydrophobic fiber materials, which comprises using the disperse dye composition defined in claim 6.

23. A process for dyeing or printing hydrophobic fiber materials, which comprises using the disperse dye composition defined in claim 7.

24. A process for dyeing or printing hydrophobic fiber materials, which comprises using the disperse dye composition defined in claim 8.

25. A process for dyeing or printing hydrophobic fiber materials, which comprises using the disperse dye composition defined in claim 9.

26. A process for dyeing or printing hydrophobic fiber materials, which comprises using the disperse dye compoition defined in claim 10.

27. A process for dyeing or printing hydrophobic fiber materials, which comprises using the disperse dye composition defined in claim 11.

28. A process for dyeing or printing hydrophobic fiber materials, which comprises using the disperse dye composition defined in claim 12.

29. A process for dyeing or printing hydrophobic fiber materials, which comprises using the disperse dye composition defined in claim 13.

30. A process for dyeing or printing hydrophobic fiber materials, which comprises using the disperse dye composition defined in claim 14.

31. A process for dyeing or printing hydrophobic fiber materials, which comprises using the disperse dye composition defined in claim 15.

32. The composition according to claim 1, wherein a mixing weight ratio of (a):(b) is selected from a range of 15 to 95:85 to 5.

33. The composition according to claim 12, wherein a mixing weight ratio of (a):(b):(c) is selected from a range of 10 to 50:10 to 70:10 to 50.

34. Hydrophobic fiber materials dyed or printed by the process defined in claim 18.

35. Hydrophobic fiber materials dyed or printed by the process defined in claim 19.

36. Hydrophobic fiber materials dyed or printed by the process defined in claim 20.

37. Hydrophobic fiber material dyed or printed by the process defined in claim 21.

38. Hydrophobic fiber material dyed or printed by the process defined in claim 22.

39. Hydrophobic fiber materials dyed or printed by the process defined in claim 23.

40. Hydrophobic fiber materials dyed or printed by the process defined in claim 24.

41. Hydrophobic fiber materials dyed or printed by the process defined in claim 25.

42. Hydrophobic fiber materials dyed or printed by the process defined in claim 26.

43. Hydrophobic fiber materials dyed or printed by the process defined in claim 27.

44. Hydrophobic fiber materials dyed or printed by the process defined in claim 28.

45. Hydrophobic fiber materials dyed or printed by the process defined in claim 29.

46. Hydrophobic fiber materials dyed or printed by the process defined in claim 30.

47. Hydrophobic fiber materials dyed or printed by the process defined in claim 31.

* * * * *